US008421756B2

(12) United States Patent
Ritzau et al.

(10) Patent No.: US 8,421,756 B2
(45) Date of Patent: Apr. 16, 2013

(54) TWO-THUMB QWERTY KEYBOARD

(75) Inventors: Jan Robert Tobias Ritzau, Veberod (SE); Per David Burstrom, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 551 days.

(21) Appl. No.: 12/235,713

(22) Filed: Sep. 23, 2008

(65) Prior Publication Data

US 2010/0073302 A1  Mar. 25, 2010

(51) Int. Cl.
*G06F 3/041* (2006.01)

(52) U.S. Cl.
USPC .......................................... 345/173; 345/174

(58) Field of Classification Search ................... 345/168, 345/173
See application file for complete search history.

(56) References Cited

U.S. PATENT DOCUMENTS

| 7,659,885 | B2* | 2/2010 | Kraus et al. | 345/168 |
| 2006/0244727 | A1* | 11/2006 | Salman et al. | 345/168 |
| 2008/0062134 | A1* | 3/2008 | Duarte et al. | 345/169 |
| 2008/0143671 | A1* | 6/2008 | Li | 345/156 |
| 2008/0192024 | A1 | 8/2008 | Mita | |
| 2009/0160776 | A1* | 6/2009 | Tsai et al. | 345/169 |
| 2009/0231282 | A1* | 9/2009 | Fyke | 345/169 |

FOREIGN PATENT DOCUMENTS

| WO | WO 99/38149 | 7/1999 |
| WO | WO 2006/091753 A2 | 8/2006 |
| WO | WO 2008/085785 A2 | 7/2008 |

OTHER PUBLICATIONS

Notification of Transmittal of the International Search Report and the Written Opinion of the International Searching Authority, or the Declaration, corresponding to PCT/IB/2009/051188, mailed Mar. 25, 2010, 17 pages.

* cited by examiner

*Primary Examiner* — Kevin M Nguyen
*Assistant Examiner* — Sepideh Ghafari
(74) *Attorney, Agent, or Firm* — Snyder, Clark, Lesch & Chung, LLP

(57) ABSTRACT

A method performed by a device having a touch panel includes detecting a location of a primary touch on the device and detecting on the touch panel a set of near-touch coordinates associated with the primary touch. The method also includes identifying the approach orientation of the primary touch as one of a left-side touch or a right-side touch based on the location of the primary touch and the near-touch coordinates. The method further includes generating a command signal based on the location of the primary touch and the approach orientation of the primary touch and performing an action based on the command signal.

18 Claims, 8 Drawing Sheets

TWO-THUMB QWERTY KEYBOARD

BACKGROUND

The proliferation of devices, such as handheld devices, has grown tremendously within the past decade. A majority of these devices include some kind of display to provide a user with visual information. These devices may also include an input device, such as a touch screen and/or one or more buttons to allow a user to enter some form of input. The size of handheld devices may limit the usable space for virtual or physical buttons available for input devices.

SUMMARY

In one implementation, a method, performed by a device having a touch panel, may include detecting a location of a primary touch on the device, detecting on the touch panel a set of near-touch coordinates associated with the primary touch, identifying the approach orientation of the primary touch as one of a left-side touch or a right-side touch based on the location of the primary touch and the near-touch coordinates, generating a command signal based on the location of the primary touch and the approach orientation of the primary touch, and performing an action based on the command signal.

Additionally, detecting the location of the primary touch on the device may further include detecting on the touch panel a set of primary touch coordinates for the primary touch.

Additionally, identifying the approach orientation of the primary touch may include determining a weighted center of the set of near-touch coordinates, determining a weighted center of the set of primary touch coordinates, and comparing the weighted center of the set of near-touch coordinates with the weighted center of the set of primary touch coordinates to determine the approach orientation.

Additionally, detecting the location of the primary touch on the device may include identifying a location of a key on a mechanical keypad that is pressed by the primary touch.

Additionally, identifying the approach orientation of the primary touch may include determining a weighted center of the set of near-touch coordinates, and comparing the weighted center of the set of near-touch coordinates with the location of the key on the mechanical keypad that is pressed by the primary touch to determine the approach orientation.

Additionally, the detecting the location of the primary touch and the detecting on the touch panel the set of near-touch coordinates may be performed using the same touch panel technology.

Additionally, the touch panel may include capacitive touch panel technology.

Additionally, the location of the primary touch may be a key of a keyboard, the key having a variable input based on the approach orientation of the primary touch.

Additionally, the location of the primary touch may be a one of a plurality of keys having variable input, the variable input including two characters of an alphabet.

In another implementation, a device may include a display to display information, a key corresponding to a location of a primary touch, a touch panel to identify a set of near-touch coordinates related to the primary touch, processing logic to interpret an approach orientation of the primary touch as one of a left-side touch or a right-side touch based on the location of the primary touch and the set of near-touch coordinates, processing logic to generate a command signal based on the identification of the primary touch location and the interpretation of the approach orientation, and processing logic to alter the display based on the command signal.

Additionally, the key corresponding to the location of the primary touch may be a key on a virtual keyboard.

Additionally, the processing logic to interpret the approach orientation of the primary touch may determine a weighted center of the set of near-touch coordinates, determine a weighted center of a set of primary touch coordinates, and compare the weighted center of the set of near-touch coordinates with the weighted center of the set of primary touch coordinates to determine the approach orientation.

Additionally, the key corresponding to the location of the primary touch may be a key on a mechanical keypad.

Additionally, the processing logic to interpret an approach orientation of the primary touch may determine a weighted center of the set of near-touch coordinates and compare the weighted center of the set of near-touch coordinates with the location of the primary touch to determine the approach orientation.

Additionally, the touch panel may be overlaid on the display.

Additionally, the touch panel may be located beneath a mechanical keypad

Additionally, the key corresponding to the location of the primary touch may be a key of a virtual keyboard displayed beneath the touch panel and the location of the primary touch may be identified using the touch panel.

In another implementation, a device may include means for detecting a location of a primary touch on the device, means for detecting location of a near-touch associated with the primary touch, means for identifying an approach orientation of the primary touch based on the location of primary touch and the location of the near-touch, means for generating a command signal based on the location of the primary touch and the approach orientation, and means for performing an action based on the command signal.

Additionally, the approach orientation may be a left-side touch or a right-side touch.

Additionally, the location of the primary touch may be a key of a keyboard, the key having a variable input based on the approach orientation of the primary touch.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Overview

The term "touch," as used herein, may refer to a touch of an object, such as a body part (e.g., a finger) or a pointing device (e.g., a soft stylus, pen, etc.). A touch may be deemed to have occurred if a sensor detects a touch, by virtue of the proximity of the deformable object to the sensor, even if physical contact has not occurred. As used herein, a "primary touch" may be a touch area registered by sensors with a particular level of sensitivity on a touch panel and a "near touch" or "near-touch area" may be a touch area in the vicinity of the primary touch registered by sensors with a different level of sensitivity than used for the primary touch. The term "touch panel," as used herein, may refer not only to a touch-sensitive panel, but a panel that may signal a touch when the finger or the object is close to the screen (e.g., a capacitive screen, a near field screen).

Figure 1:
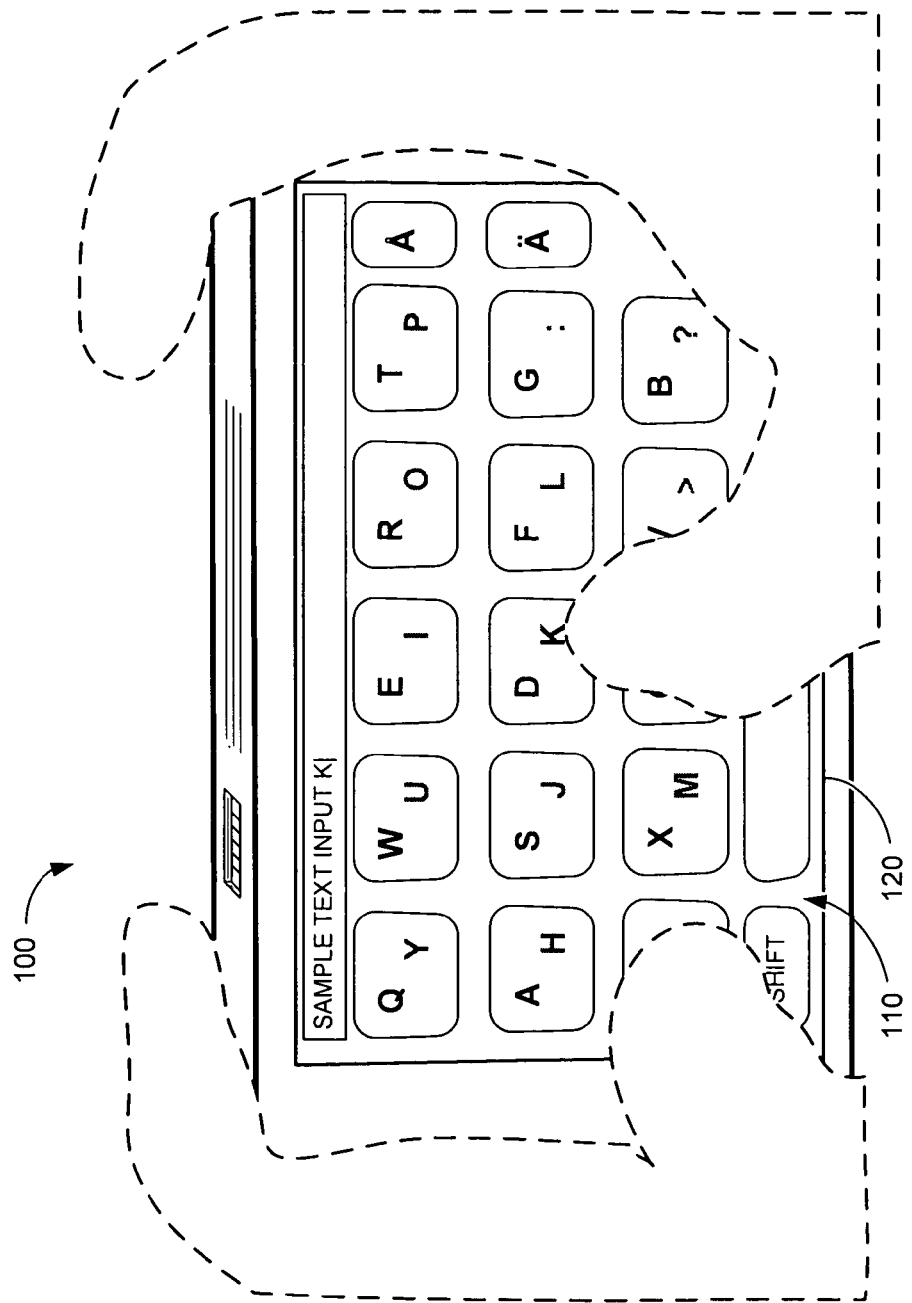
FIG. 1 is a schematic illustrating exemplary implementations of the systems and methods described herein.

FIG. 1 is a schematic illustrating an exemplary implementation of the systems and methods described herein. Implementations described herein may utilize touch-recognition techniques that distinguish between a touch originating from a left-side and a touch originating from a right-side. The determination of the originating side of the touch (also referred to herein as the "approach orientation") may be used to distinguish different user input for the same touch location. Thus, the keys of a virtual or mechanical keyboard may be split and overlapped to allow for a larger "hit area" for each key within the same physical space.

FIG. 1 illustrates an implementation of a virtual keyboard applied to electronic device 100 according to the systems and methods described herein. Referring to FIG. 1, an electronic device 100 may include a display 110 and a touch panel 120 overlaying display 110. More details of electronic device 100 are provided with respect to FIGS. 2-4. As shown, the device may show on display 110 a virtual keyboard that effectively splits in half a conventional QWERTY-format keyboard and overlaps the characters of the right keyboard half and the left keyboard half. Thus, each key on the virtual keyboard may include two characters, and the character to be input in response to a user's touch may be determined based on the finger (e.g., right or left thumb) used by the user to touch the key. For example, the "D K" key may be touched to provide a "D" input or a "K" input. As shown in FIG. 1, device 100 may interpret the selection of the "D K" key by a user's right thumb as a "K." In implementations described herein, a touch on a touch panel may be identified as a variable input signal depending on the approach orientation of the touch (e.g., a right hand touch or a left hand touch). In one implementation, the approach orientation of the touch may be determined based on identification of a set of primary touch coordinates and a set of near touch coordinates for each user input on the virtual keyboard.

Exemplary Device

Figure 2:
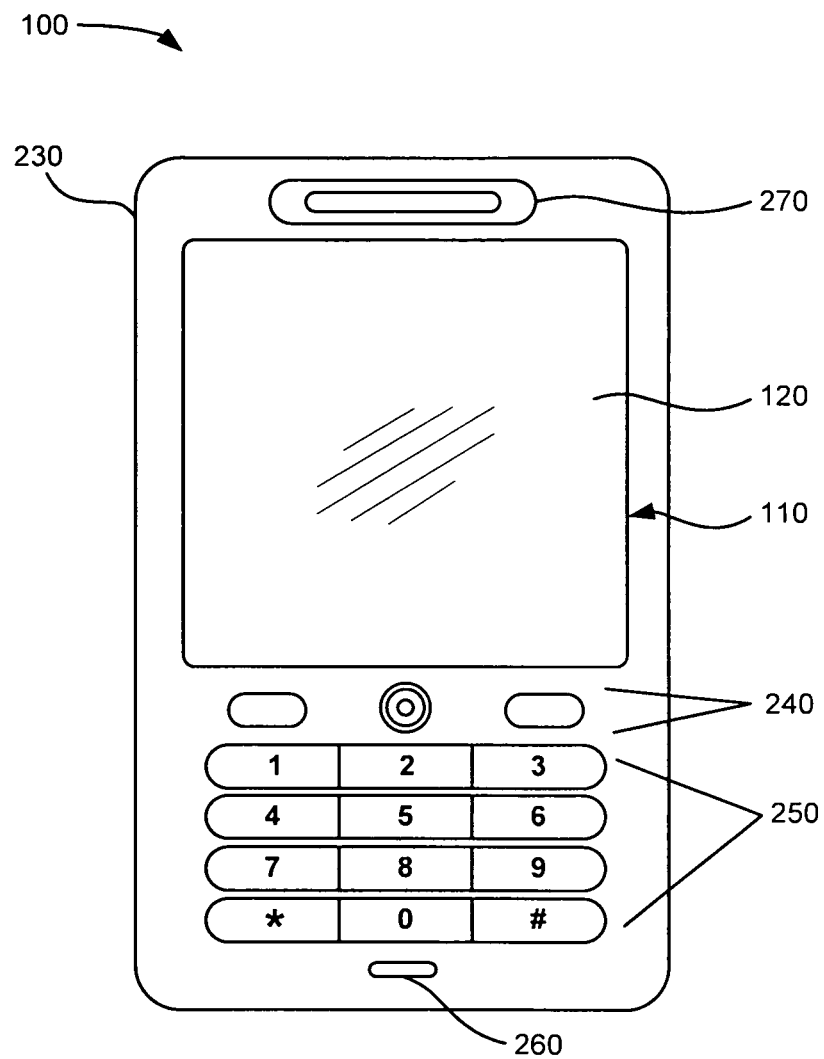
FIG. 2 is a diagram of an exemplary electronic device in which methods and systems described herein may be implemented.

FIG. 2 is a diagram of an exemplary electronic device 100 in which methods and systems described herein may be implemented. Implementations are described herein in the context of an electronic device having a touch panel. As used herein, the term "electronic device" may include a cellular radiotelephone; a smart phone, a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; a gaming device; a media player device; a digital camera; or another device that may use touch panel input. While implementations herein may be described in the context of a handheld electronic device having a touch screen (e.g., a touch panel overlaid on a display), other implementations may include other touch-panel-enabled devices, such as a desktop, laptop or palmtop computer.

Referring to FIG. 2, electronic device 100 may include display 110, touch panel 120, housing 230, control buttons 240, keypad 250, microphone 260, and speaker 270. The components described below with respect to electronic device 100 are not limited to those described herein. Other components, such as a camera, connectivity ports, memory slots, and/or additional speakers, may be located on electronic device 100.

Display 110 may include a device that can display signals generated by electronic device 100 as text or images on a screen (e.g., a liquid crystal display (LCD), cathode ray tube (CRT) display, organic light-emitting diode (OLED) display, surface-conduction eletro-emitter display (SED), plasma display, field emission display (FED), bistable display, etc.). In certain implementations, display 110 may provide a high-resolution, active-matrix presentation suitable for the wide variety of applications and features associated with typical mobile devices.

Display 110 may provide visual information to the user and serve—in conjunction with touch panel 120—as a user interface to detect user input. For example, display 110 may provide information and menu controls regarding incoming or outgoing telephone calls and/or incoming or outgoing electronic mail (e-mail), instant messages, short message service (SMS) messages, etc. Display 110 may further display information and controls regarding various applications executed by electronic device 100, such as a web browser, a phone book/contact list program, a calendar, an organizer application, image manipulation applications, navigation/mapping applications, an MP3 player, as well as other applications. For example, display 110 may present information and images associated with application menus that can be selected using multiple types of input commands. Display 110 may also display images associated with a camera, including pictures or videos taken by the camera and/or received by electronic device 100. Display 110 may also display video games being played by a user, downloaded content (e.g., news, images, or other information), etc.

As shown in FIG. 2, touch panel 120 may be integrated with and/or overlaid on display 110 to form a touch screen or a panel-enabled display that may function as a user input interface. For example, in one implementation, touch panel 120 may include a near field-sensitive (e.g., capacitive), acoustically-sensitive (e.g., surface acoustic wave), photo-sensitive (e.g., infra-red), and/or any other type of touch panel overlay that allows display 110 to be used as an input device. In another implementation, touch panel 120 may include multiple touch-sensitive technologies. Generally, touch panel 120 may include any kind of technology that provides the ability to identify an object near a touch panel surface (e.g., a near touch) along with the location of a user's intended touch (e.g., a primary touch).

In one embodiment, touch panel 120 may include a capacitive touch overlay including multiple touch sensing points. An object having capacitance (e.g., a user's thumb) may be placed on or near touch panel 120 to form a capacitance between the object and one or more of the touch sensing points. The touch panel 120 may, for example, register a particular level of capacitance for a "touch" and a lower level of capacitance for a "near touch." The amount and location of touch sensing points registered as a "touch" and a "near touch" may be used to determine coordinates (e.g., location) and to approximate orientation of the touch. The touch coordinates may be associated with a portion of display 110 having corresponding coordinates. In still another implementation, force-detection technology may be used where multiple pressure-sensitive nodes/pixels may be used to detect the presence and nearby dimensions of a touch.

In another implementation, touch panel 120 may include multiple touch panel technologies. For example, touch panel 120 may include one touch technology (e.g., resistive, capacitive, or other technology) to identify the location of a primary touch and another touch technology (e.g., infra-red, optical, or other technology) to identify the near-touch area in the vicinity of the primary touch.

In other implementations, touch panel 120 may be smaller or larger than display 110. In still other implementations, touch panel 120 may not overlap the area of display 110, but instead may be located elsewhere on the surface of handheld electronic device 100, such as under keypad 250. In other embodiments, touch panel 120 may be divided into multiple touch panels, such as touch panels in strips around the edges of display 110.

Housing 230 may protect the components of electronic device 100 from outside elements. Control buttons 240 may also be included to permit the user to interact with electronic device 100 to cause electronic device 100 to perform one or more operations, such as place a telephone call, play various media, access an application, etc. For example, control buttons 240 may include a dial button, hang up button, play button, etc. One of control buttons 240 may be a menu button that permits the user to view various settings on display 110. In one implementation, control keys 140 may be pushbuttons.

Keypad 250 may also be included to provide input to electronic device 100. In one implementation, keypad 250 may include a standard telephone keypad. In another implementation, keypad 250 may include keys for text input, such as overlapping keys in QWERTY-format. Keys on keypad 250 may perform multiple functions depending upon a particular application selected by the user. In one implementation, each key of keypad 250 may be, for example, a pushbutton. A user may utilize keypad 250 for entering information, such as text or a phone number, or activating a special function. Alternatively, keypad 250 may take the form of a keyboard that may facilitate the entry of alphanumeric text.

Microphone 260 may receive audible information from the user. Microphone 260 may include any component capable of transducing air pressure waves to a corresponding electrical signal. Speaker 270 may provide audible information to a user of electronic device 100. Speaker 270 may include any component capable of transducing an electrical signal to a corresponding sound wave. For example, a user may listen to music through speaker 270.

Figure 3:
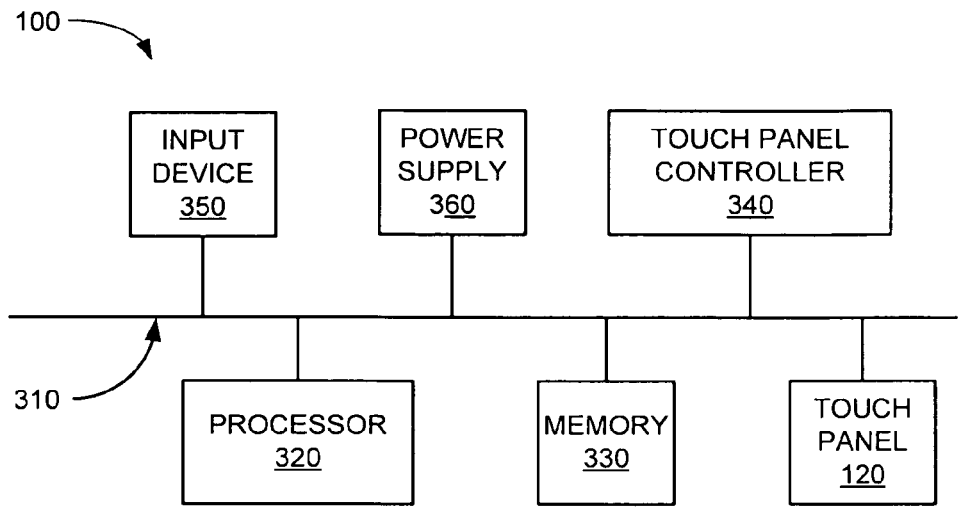
FIG. 3 is a block diagram illustrating components of the electronic device of FIG. 2 according to an exemplary implementation.

FIG. 3 is a block diagram illustrating components of electronic device 100 according to an exemplary implementation. Electronic device 100 may include bus 310, processor 320, memory 330, touch panel 120, touch panel controller 340, input device 350, and power supply 360. Electronic device 100 may be configured in a number of other ways and may include other or different components than those depicted in FIG. 3. For example, electronic device 100 may include one or more output devices, modulators, demodulators, encoders, and/or decoders for processing data.

Bus 310 may permit communication among the components of electronic device 100. Processor 320 may include a processor, a microprocessor, an application specific integrated circuit (ASIC), a field programmable gate array (FPGA), or the like. Processor 320 may execute software instructions/programs or data structures to control operation of electronic device 100.

Memory 330 may include a random access memory (RAM) or another type of dynamic storage device that may store information and instructions for execution by processor 320; a read only memory (ROM) or another type of static storage device that may store static information and instructions for use by processor 320; a flash memory (e.g., an electrically erasable programmable read only memory (EEPROM)) device for storing information and instructions; and/or some other type of magnetic or optical recording medium and its corresponding drive. Memory 330 may also be used to store temporary variables or other intermediate information during execution of instructions by processor 320. Instructions used by processor 320 may also, or alternatively, be stored in another type of computer-readable medium accessible by processor 320. A computer-readable medium may include one or more physical or logical memory devices.

Touch panel 120 may accept touches from a user that can be converted to signals used by electronic device 100. In one implementation, electronic device 100 may include a single touch panel 120. In another implementation, touch panel 120 may include two or more touch panel technologies in a single touch panel or in multiple touch panels. Touch coordinates on touch panel 120 may be communicated to touch panel controller 340. Data from touch panel controller 340 may eventually be passed on to processor 320 for processing to, for example, associate the touch coordinates with information displayed on display 110.

Touch panel controller 340 may include hardware- and/or software-based logic to identify input received at touch panel 120. For example, touch panel controller 340 may identify which sensors may indicate a touch on touch panel 120 and the location of the sensors registering the touch. In one implementation, touch panel controller 340 may be included as part of processor 320. Touch panel controller 340 may include logic to identify input from a single type of touch panel technology or from two or more touch panel technologies in a single touch panel or in multiple touch panels.

Input device 350 may include one or more mechanisms in addition to touch panel 120 that permit a user to input information to electronic device 100, such as microphone 260, keypad 250, control buttons 240, a keyboard, a gesture-based device, an optical character recognition (OCR) based device, a joystick, a virtual keyboard, a speech-to-text engine, a mouse, a pen, voice recognition and/or biometric mechanisms, etc. In one implementation, input device 350 may also be used to activate and/or deactivate touch panel 120.

Power supply 360 may include one or more batteries or another power source used to supply power to components of electronic device 100. Power supply 360 may also include control logic to control application of power from power supply 360 to one or more components of electronic device 100.

Electronic device 100 may provide a platform for a user to view images; send and receive electronic mail and/or text messages; make and receive telephone calls; play various media, such as music files, video files, multi-media files, and/or games; and execute various other applications. Electronic device 100 may perform these operations in response to processor 320 executing sequences of instructions contained in a computer-readable medium, such as memory 330. Such instructions may be read into memory 330 from another computer-readable medium. In alternative embodiments, hard-wired circuitry may be used in place of or in combination with software instructions to implement operations described herein. Thus, implementations described herein are not limited to any specific combination of hardware circuitry and software.

Figure 4:
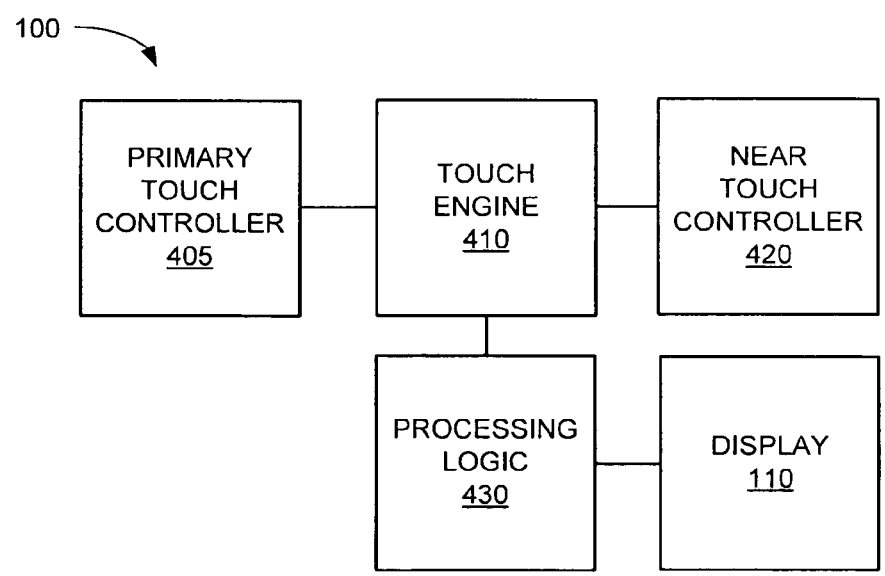
FIG. 4 is functional block diagram of the electronic device of FIG. 3.

FIG. 4 is a functional block diagram of exemplary components that may be included in electronic device 100. As shown, electronic device 100 may include primary touch panel controller 405, touch engine 410, processing logic 430, and display 110. Electronic device 100 may also optionally include "near touch" controller 420. In other implementations, electronic device 100 may include fewer, additional, or different types of functional components than those illustrated in FIG. 4.

Primary touch controller 405 may identify touch coordinates from touch panel 120. Coordinates from primary touch controller 405 may be passed on to touch engine 410 to associate the touch coordinates with, for example, an object displayed on display 110. In one implementation, primary touch controller 405 may identify touch coordinates for a primary touch. In another implementation, primary touch controller 405 may identify touch coordinates for both a primary touch and a near touch. In one implementation, primary touch controller 405 may be included as part of touch panel controller 340 of FIG. 3.

Optional near touch controller 420 may also identify touch coordinates from touch panel 120. Particularly, near touch controller 420 may identify coordinates for a near touch associated with a primary touch. The near touch, for example, may be registered using a different touch panel technology than used to register the primary touch. Thus, near touch controller 420 may provide a second set of touch coordinates to pass on to touch engine 410 to be associated with the touch coordinates of the primary touch from primary touch controller 405. In other implementations, near touch controller 420 may be included as part of primary touch controller 405. In one implementation, near touch controller 420 may be included as part of touch panel controller 340 of FIG. 3.

Touch engine 410 may include hardware and/or software for processing signals that are received at primary touch controller 405 and/or near touch controller 420. More specifically, touch engine 410 may use the signal received from primary touch controller 405 and/or near touch controller 420 to detect primary touches and near touches on touch panel 120 and determine the approach orientation of the primary touches so as to differentiate between types of touches (e.g., touches from the left side or right side). The primary touch location and the approach orientation may be used to provide a variety of user input to electronic device 100.

Processing logic 430 may implement changes based on signals from touch engine 410. For example, in response to signals that are received at primary touch controller 405 and/or near touch controller 420, touch engine 410 may cause processing logic 430 to identify a left-based or right-based character input from the key identified by the primary touch (e.g., a "D" or a "K" in the example of FIG. 1). Changes implemented by processing logic may be shown on display 110. In other implementations, processing logic 430 may send signals to other components of electronic device 100 based on the signals from touch engine 410.

Exemplary Touch Patterns

Figure 5:
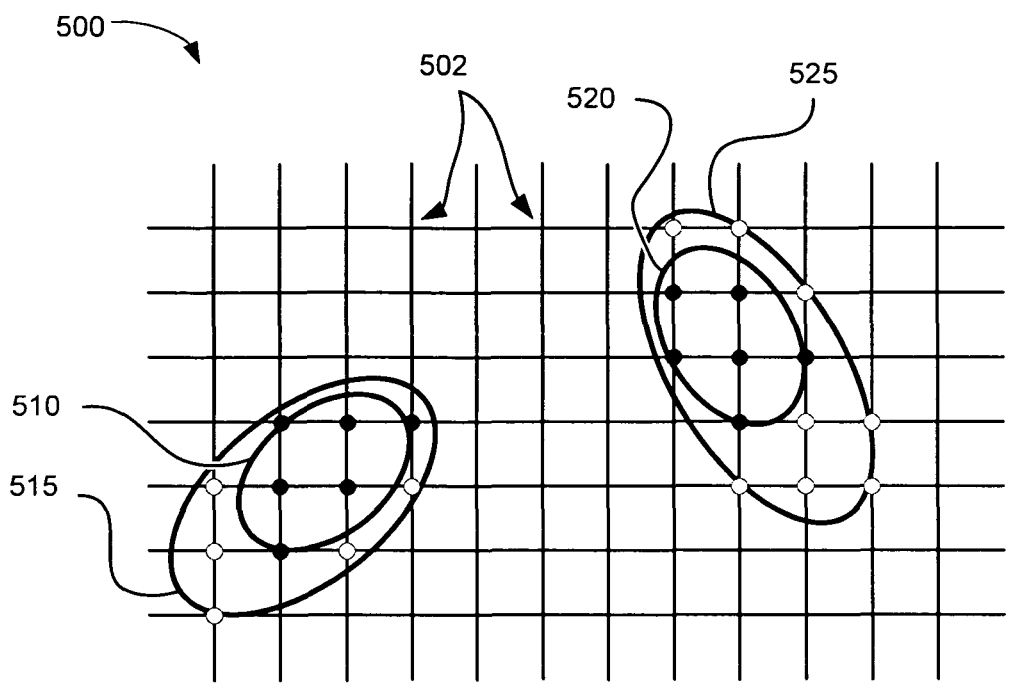
FIG. 5 shows an exemplary left and right thumb input on the surface of a touch panel.

FIG. 5 is a diagram illustrating exemplary touch patterns on a surface 500 of a touch panel 120 of an exemplary electronic device. A touch panel (such as touch panel 120 of FIG. 1) may generally include a surface 500 configured to detect a touch at one or more sensing nodes 502. In one implementation, surface 500 may include sensing nodes 502 using a grid arrangement of transparent conductors to track approximate horizontal (e.g., "X") and vertical (e.g., "Y") positions, as shown in FIG. 5. In other implementations, other arrangements of sensing nodes 502 may be used, including polar coordinates, parabolic coordinates, etc. The number and configuration of sensing nodes 502 may vary depending on the required accuracy/sensitivity of the touch panel. Generally, more sensing nodes can increase accuracy/sensitivity of the touch panel. A signal may be produced when an object (e.g., a user's thumb) touches a region of surface 500 over a sensing node 502.

Surface 500 of FIG. 5 may represent a multi-touch sensitive panel. Each sensing node 502 may represent a different position on surface 500 of the touch panel, and each sensing node 502 may be capable of generating a signal at the same time. When an object is placed over multiple sensing nodes 502 or when the object is moved between or over multiple sensing nodes 502, multiple signals may be generated.

Referring to FIG. 5, a thumb (or finger, or other object) may touch surface 500 in the area denoted by oval 510 indicating a primary touch position. The primary touch may be registered at one or more sensing nodes 502 of surface 500, allowing the touch panel to identify coordinates of the primary touch. Another oval 515 may indicate the area of the thumb (or finger, or other object) that creates a near touch during the primary touch. The near touch may be registered at one or more sensing nodes 502 of surface 500, allowing the touch panel to identify coordinates of the near touch. In one implementation, the center of weight of the primary touch (e.g., oval 510) and the center of weight of the near touch (oval 515) may be calculated to determine the approach orientation of the touch. In one implementation, the touch coordinates may be associated with an object on a display underlying the touch screen, such as a key on virtual keyboard. Thus, in FIG. 5, the touch indicated by oval 510 and oval 515 may be interpreted as a left-hand touch. Similarly, oval 520 may indicate another primary touch area, and oval 525 may indicate a related near-touch area. The center of weight of the primary touch (e.g., oval 520) and the center of weight of the near touch (oval 525) may be calculated to determine the approach orientation of the touch, which may be interpreted as a right-hand touch for oval 520 and 525.

As shown in FIG. 5, coordinates for a primary touch and a near touch may be obtained using a touch panel that can sense multiple nodes, such as a capacitive or projected capacitive touch panel. In other embodiments, measurements may be obtained using other technologies (including multiple types of touch technologies) that can generally generate signals to indicate dimensions or shapes of a primary touch and a near touch. Such technologies may include resistive technologies, surface acoustic wave technologies, infra-red technologies, and/or optical technologies.

Figure 6:
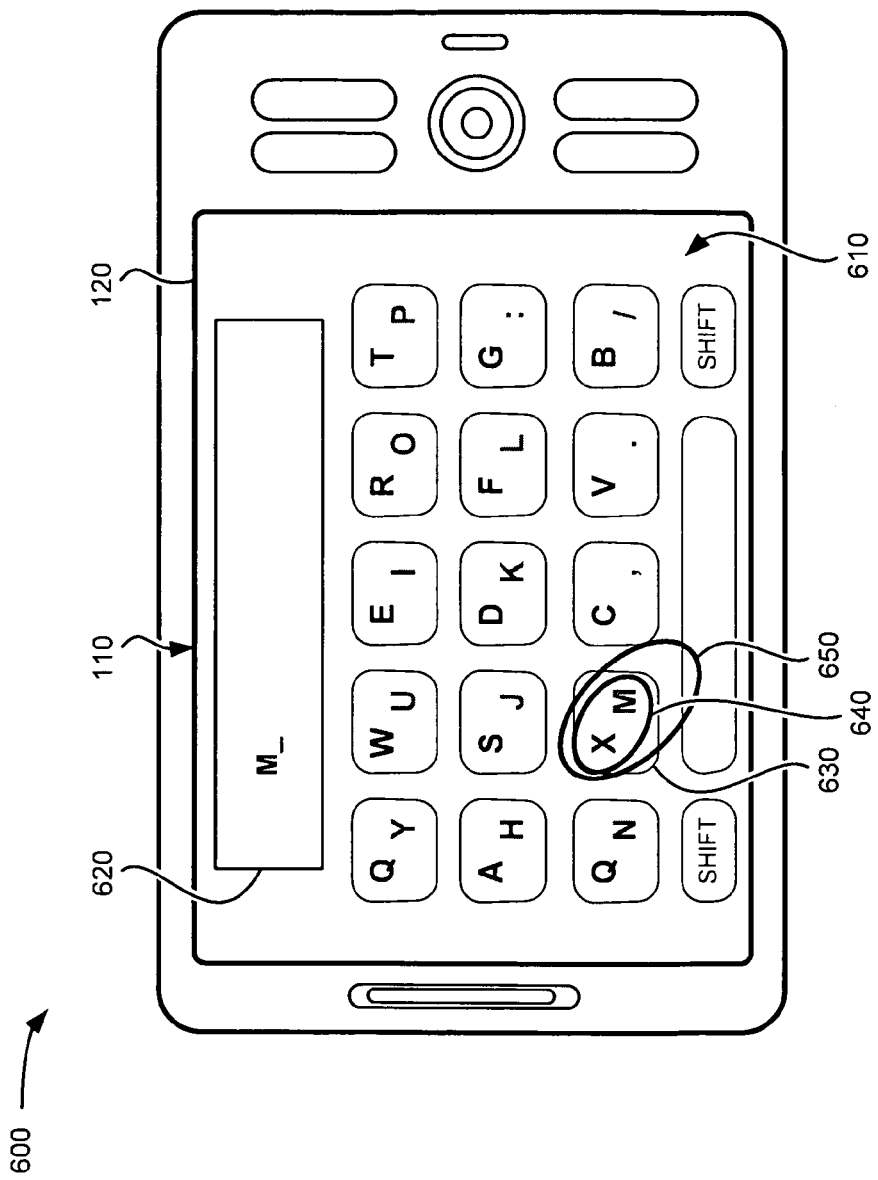
FIG. 6 is a diagram illustrating exemplary touch patterns on the surface of an exemplary electronic device.

FIG. 6 is a diagram illustrating exemplary touch patterns on the surface of an electronic device, such as display 110 and touch panel 120 on electronic device 600. Virtual keyboard 610 and text entry window 620 are shown on display 110. A user's touch (e.g., a thumb, finger, or other object) on touch panel 120 may be distinguished based on the approach orientation of the touch (e.g., a touch from the left hand or the right hand). Implementations described herein may utilize the fact that a single touch with a thumb (or other object) may register two sets of coordinates: a set of primary touch coordinates and a set of near-touch coordinates.

Referring to FIG. 6, a user's thumb may contact touch panel 120 at virtual key 630, which may alternately represent input of an "X" character or an "M" character depending on the approach orientation of the touch. The user input may generate a first set of coordinates that register as primary touch area 640 and a second set of coordinates that registers as near-touch area 650 in the vicinity of virtual key 630. The coordinates for primary touch area 640 and as near-touch area 650 may be interpreted as a right-hand touch and, thus, generate a signal within electronic device 100 to display, for example, an uppercase "M" in text entry window 620.

Exemplary Process Flow

Figure 7:
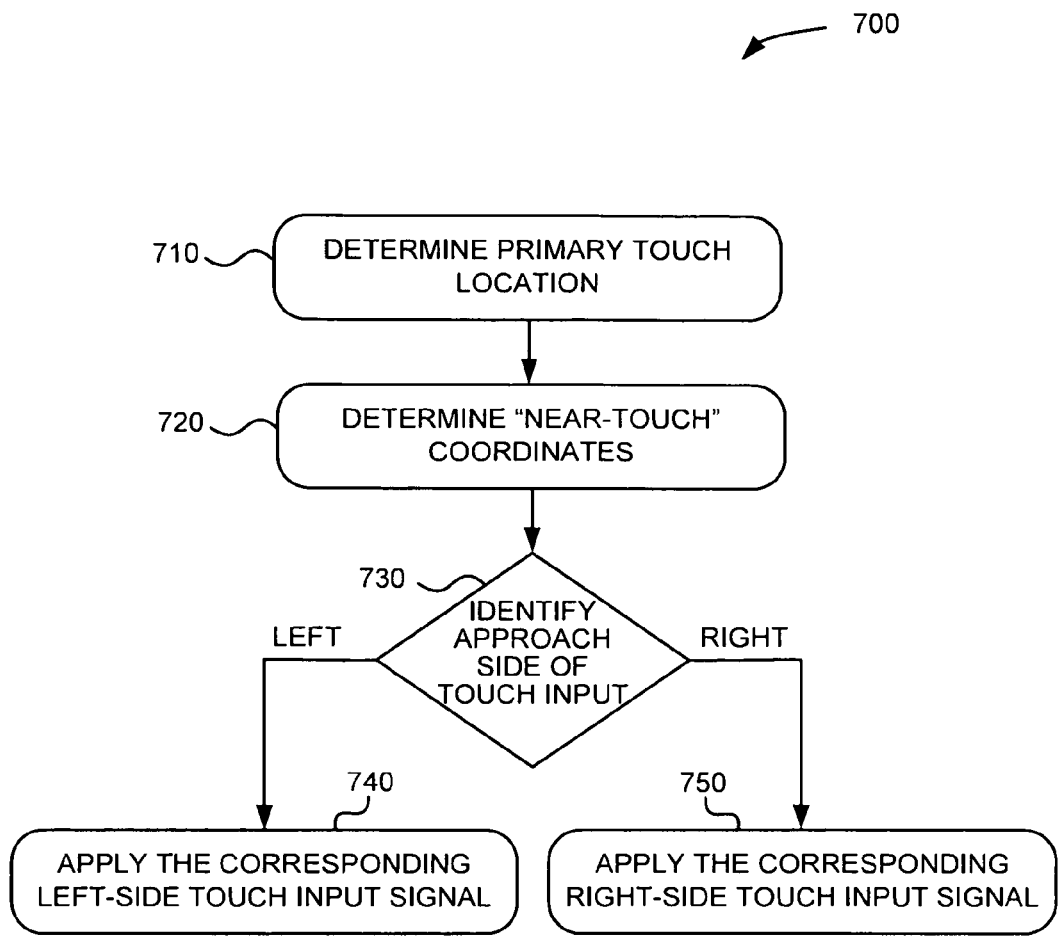
FIG. 7 is a flow diagram illustrating exemplary operations associated with the exemplary electronic device of FIG. 2.

FIG. 7 is a flow diagram 700 illustrating exemplary operations associated with an electronic device having a touch panel. For example, the operations may be performed by electronic device 100 of FIG. 1, including touch panel 120.

A primary touch location may be determined (block 710). For example, electronic device 100 may identify a primary touch location by a user on a keyboard. In one implementation the primary touch location may be a set of coordinates of a primary touch on a key of a virtual keyboard. In another implementation, the primary touch location may be determined by a user pressing a mechanical key on a keypad. Whether a key on a virtual keyboard or a mechanical key on a keypad, the key identified by the primary touch may include at least two characters the selection of which character being determined based on the determination of where the touch originated (e.g., the left or right side of device 100).

"Near-touch" coordinates may be determined (block 720). For example, electronic device 100 may detect near-touch coordinates associated with the primary touch of block 710. In one implementation, the near-touch coordinates may be detected by a touch panel overlaying a display, such as touch panel 120 of FIG. 2. In another implementation, the near-touch coordinates may be detected by a touch panel located, for example, under a keypad. The near-touch coordinates may generally identify an area in the vicinity of the primary touch, and, in one implementation, an area larger than the primary touch. Particularly, in one implementation, the near-touch coordinates may include coordinates of a portion of a user's thumb (or another object) that is close to the touch panel, but not close enough to register as a primary touch.

The approach side of the touch input may be identified (block 730). For example, electronic device 100 may identify the approach side of the touch input (e.g., from the left or right side of device 100) to determine the appropriate signal to send from processing logic 430 to other system components. In one implementation, electronic device 100 may calculate the center of weight of the primary touch and the near-touch coordinates. Based on the location of the center of weight for each of the primary touch and the near-touch coordinates, electronic device 100 may determine the approach side of the touch. In another implementation, electronic device 100 may use the location of a pressed mechanical key to identify the location of the primary touch and compare the mechanical key location with the weighted center of the near-touch coordinates. In other implementations, different calculations may be used to determine the approach side of a touch, based on the geometry of registered coordinates of the near-touch and/or primary touch.

If a left-side approach is determined, an input signal corresponding to a left-side touch may be applied (block 740). For example, electronic device 100 may apply a left-side touch input signal corresponding to a key on a keyboard, such as key 630 on keyboard 610 of FIG. 6. A left-side touch input signal for key 630 may correspond to an "X" on keyboard 610.

If a right-side approach is determined, an input signal corresponding to a right-side touch may be applied (block 740). For example, electronic device 100 may apply a right-side touch input signal corresponding to a key on a keyboard, such as key 630 on keyboard 610. A right-side touch input signal for key 630 may correspond to an "M" on keyboard 610.

EXAMPLES

Figure 8B:
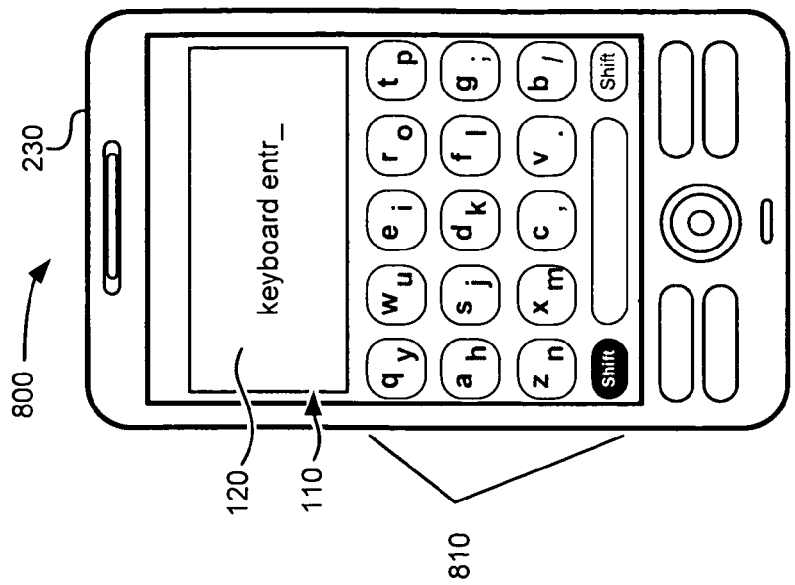
FIGS. 8A and 8B are diagrams of another exemplary electronic device in which methods and systems described herein may be implemented.
Figure 8A:
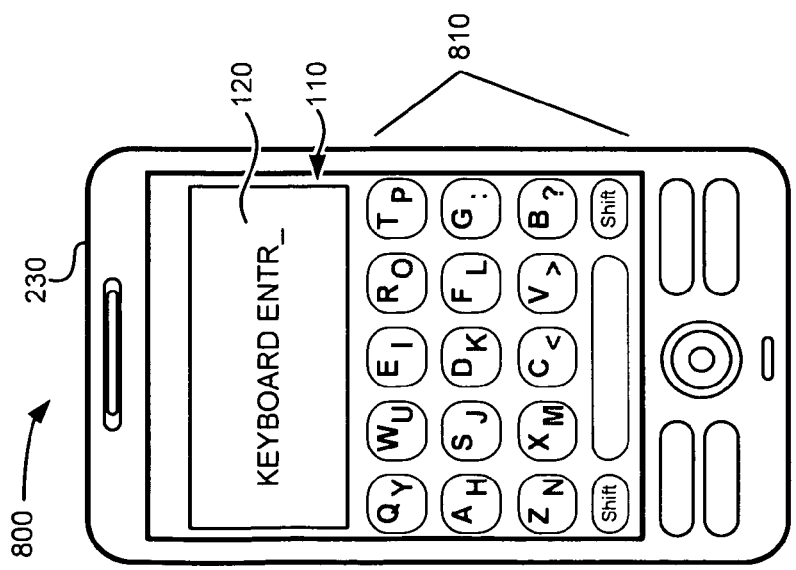

FIGS. 8A and 8B are diagrams of another exemplary electronic device 800 in which methods and systems described herein may be implemented. Electronic device 800 may include housing 230, display 110, and touch panel 120. Other components, such as control buttons, a keypad, a microphone, a camera, connectivity ports, memory slots, and/or additional speakers, may be located on electronic device 800, including, for example, on a rear or side panel of housing 230.

FIG. 8A shows an implementation of virtual keyboard 810 on display 110. Some or all of the keys of virtual keyboard 810 may display multiple characters associated with a single key, so that an input signal generated by a touch on touch panel 120 may be selected from one of the multiple characters based on the approach orientation of the touch. FIG. 8B shows another implementation of virtual keyboard 810 on display 110. As shown in FIG. 8B, a virtual "Shift" key may be touched by a user to alter the display of the multiple characters associated with each key. Thus, in FIG. 8B, each key may display different characters and/or symbols available for selection by a user. In one implementation, removing a touch from the "Shift" key may cause display 110 to revert virtual keyboard 810 from the arrangement shown in FIG. 8B to the arrangement shown in FIG. 8A. In another implementation, touching the "Shift" key may cause display 110 to maintain the arrangement of virtual keyboard 810 shown in FIG. 8B until the "Shift" key is touched a second time.

In another implementation, maintaining a touch on the "Shift" key in the lower left-side corner (as shown in FIG. 8B), may allow electronic device 800 to determine (without the need for calculating weighted centers of a primary touch and a near-touch) that a subsequent touch on a key of virtual keyboard 810 will be a right-side touch. Conversely, maintaining a touch on the "Shift" key in the lower right-side corner, may allow electronic device 800 to determine that a subsequent touch on a key of virtual keyboard 810 will be a left-side touch.

Figure 9:
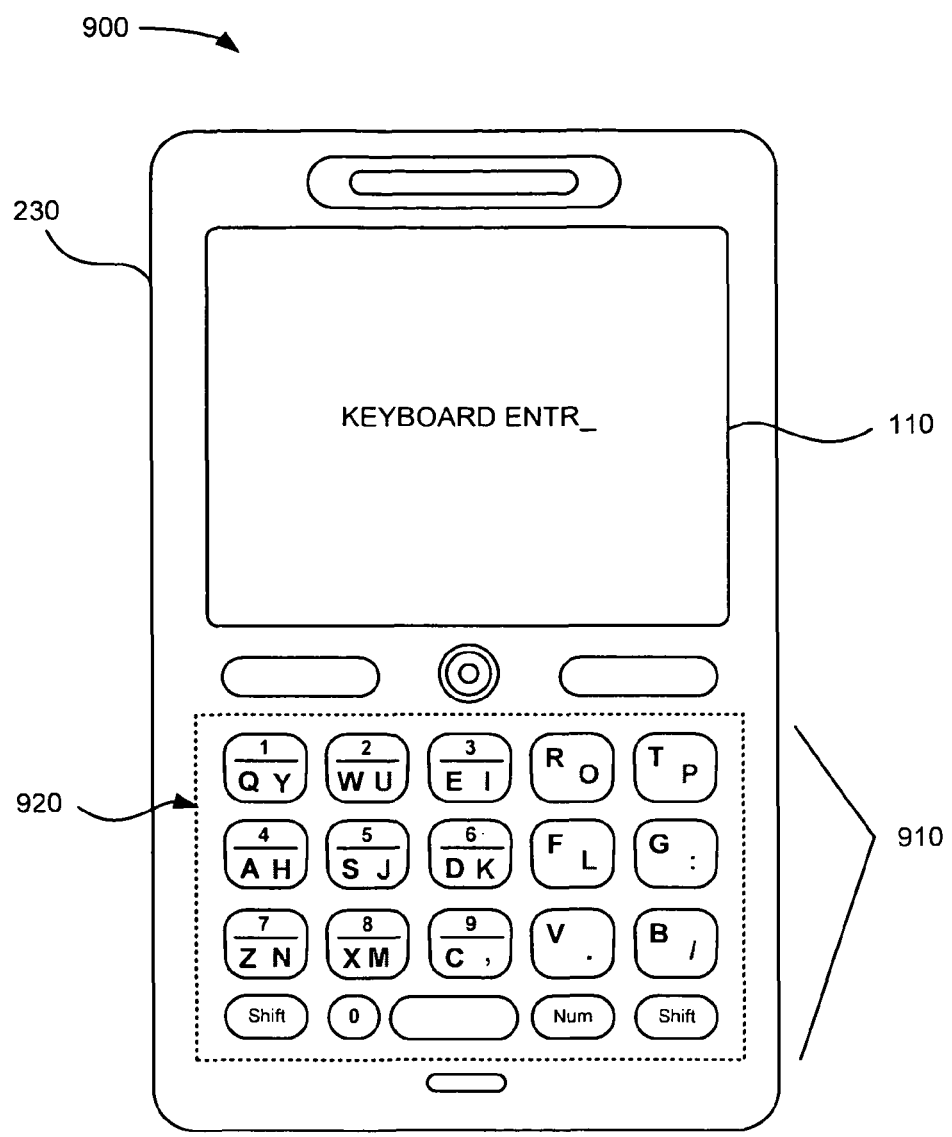
FIG. 9 is a diagram of a further exemplary electronic device in which methods and systems described herein may be implemented.

FIG. 9 is a diagram of a further exemplary electronic device 900 in which methods and systems described herein may be implemented. Electronic device 900 may include housing 230, display 110, keypad 910, and touch panel 920. Other components, such as control buttons, a second touch panel, a microphone, a camera, connectivity ports, memory slots, and/or additional speakers, may be located on electronic device 900, including, for example, on a rear or side panel of housing 230.

Keypad 910 may be configured with individual keys that may display multiple characters associated with a single key.

When a key on keypad 910 is pressed by a user, a particular input signal may be selected from one of the multiple characters on the key based on the approach orientation of the touch. In one implementation, touch panel 920 may be located under keypad 910 to identify near-touch coordinates when a key on keypad 910 is pressed by a user. Touch panel 920 may include a near field-sensitive (e.g., capacitive), acoustically-sensitive (e.g., surface acoustic wave), photo-sensitive (e.g., infra-red), and/or any other type of touch recognition technology that allows touch panel 920 to identify a near-touch associated with a user pressing a key on keypad 910. In another implementation, touch panel 120 may include multiple touch-sensitive technologies. Generally, touch panel 120 may include any kind of technology that provides the ability to identify an object near a touch panel surface (e.g., a near touch) along with the location of a user's intended touch (e.g., a primary touch). In another implementation, touch panel 920 may be overlaid on keypad 910.

Electronic device 900 may use the location of a pressed key on keypad 910 to identify a primary touch location and may use a set of coordinates from touch panel 920 to identify a near-touch location. Electronic device 900 may compare the key location on the keypad with, for example, the weighted center of the near-touch coordinates to determine an approach orientation of the touch. Based on the determined approach orientation, electronic device 900 may apply a left-side or a right-side input associated with the key selected by the user. The determined key input may shown, for example, on display 110.

In one implementation, keys on keypad 920 may be configured to indicate the whether a left-side or right-side input is being applied. Such indication may be, for example, an illumination of the selected character on the key of keypad 920. In another implementation, the use of a "Shift" key and/or a "Num" key may be used to alter the input options for some or all of the keys on keypad 920.

CONCLUSION

Implementations described herein may be used to produce different characters from the same key on a keyboard of an electronic device. The identification of which character to display may be determined based on the identification of the originating side of a user's touch (e.g., a right-side thumb or a left-side thumb). The use of variable input for the same key on a keyboard may effectively double the available hit area of keys on a virtual keyboard or mechanical keypad. By taking, for example, characters from a QWERTY-format keyboard and overlaying the conventional right-hand keys with the conventional left-hand keys, each key may be made to include a variable left-side and right-side input.

The foregoing description of the embodiments described herein provides illustration and description, but is not intended to be exhaustive or to limit the invention to the precise form disclosed. Modifications and variations are possible in light of the above teachings or may be acquired from practice of the invention.

For example, implementations have been mainly described in the context of a mobile communication device. These implementations, however, may be used with any type of device with a touch panel that can be configured to identify an approach orientation of a touch.

As another example, implementations have been described with respect to certain touch panel technologies. Other technologies that can distinguish between surface areas of a touch may be used to accomplish certain implementations, such as different types of touch panel technologies, including but not limited to, resistive touch panels, surface acoustic wave technology, capacitive touch panels, infra-red touch panels, strain gauge mounted panels, optical imaging touch screen technology, dispersive signal technology, acoustic pulse recognition, and/or total internal reflection technologies. Furthermore, in some implementations, multiple types of touch panel technology may be used within a single device.

As a further example, distinguishing the approach orientation of a touch may be used to provide separate inputs for other objects (besides a keyboard) on a touch-enabled display. In one exemplary implementation, left-side touch on a displayed object may be used to indicate a command to enter a program, while a right-side touch on the same displayed object may open an option menu. In another exemplary implementation, a left-side touch may generally mimic a user input of a left side of a two button input device (such a computer mouse), while a right-side touch may mimic the right side button of the same two button input device. In a further exemplary implementation, the distinction between a right-side touch and a left-side touch may be used to differentiate between different command functions in a gaming environment. In yet another exemplary implementation, in the context of a web browser application, an electronic device (such as electronic device 100) may apply a left-side touch input signal to access a link in a web page and apply a right-side touch input signal to open a menu relevant to the link on the web page.

In still another example, implementations of the systems and methods herein may include other combinations of characters, other alphabets, and/or other languages than those mainly described herein. Thus, while implementations have been show primarily in the context of a keypad that overlaps the characters on a conventional QWERTY-format keyboard, other combinations of letter and/or other characters may be used to provide variable input for each keyboard key.

Further, while a series of blocks has been described with respect to FIG. 7, the order of the blocks may be varied in other implementations. Moreover, non-dependent blocks may be performed in parallel.

Aspects described herein may be implemented in methods and/or computer program products. Accordingly, aspects may be embodied in hardware and/or in software (including firmware, resident software, micro-code, etc.). Furthermore, aspects described herein may take the form of a computer program product on a computer-usable or computer-readable storage medium having computer-usable or computer-readable program code embodied in the medium for use by or in connection with an instruction execution system. The actual software code or specialized control hardware used to implement these aspects is not limiting. Thus, the operation and behavior of the aspects were described without reference to the specific software code—it being understood that software and control hardware could be designed to implement the aspects based on the description herein.

Further, certain aspects described herein may be implemented as "logic" that performs one or more functions. This logic may include firmware, hardware—such as a processor, microprocessor, an application specific integrated circuit or a field programmable gate array—or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method performed by a device having a touch panel, the method comprising:
    providing input keys for the device, each key having both a character from a right keyboard half of a known keyboard format and a character from a left keyboard half of the known keyboard format, wherein each of the input keys represents variable inputs;
    detecting a primary touch on a particular one of the keys of the device, wherein the primary touch is detected based on a first level of sensitivity of the touch panel;
    detecting on the touch panel a set of near-touch coordinates associated with the primary touch, wherein the near-touch coordinates are detected based on a second level of sensitivity of the touch panel, wherein the first level of sensitivity is different than the second level of sensitivity;
    identifying an approach orientation of the primary touch as one of a left-hand input or a right-hand input based on the location of the primary touch and the near-touch coordinates;
    generating a first command signal for one of the variable inputs of the particular one of the keys corresponding to the character from the right keyboard half when the approach orientation of the primary touch is identified as a right-hand input;
    generating a second command signal for another of the variable inputs of the particular one of the keys corresponding to the character from the left keyboard half when the approach orientation of the primary touch is identified as a left-hand input; and
    performing an action based on the first command signal or the second command signal.

2. The method of claim 1, where detecting the primary touch on the particular one of the keys of the device comprises:
    detecting on the touch panel a set of primary touch coordinates for the primary touch.

3. The method of claim 2, where identifying the approach orientation of the primary touch comprises:
    determining a weighted center of the set of near-touch coordinates;
    determining a weighted center of the set of primary touch coordinates; and
    comparing the weighted center of the set of near-touch coordinates with the weighted center of the set of primary touch coordinates to determine the approach orientation.

4. The method of claim 1, where detecting the primary touch on the particular one of the keys of the device comprises:
    identifying a location of the particular one of the keys on a mechanical keypad that is pressed by the primary touch.

5. The method of claim 4, where identifying the approach orientation of the primary touch comprises:
    determining a weighted center of the set of near-touch coordinates; and
    comparing the weighted center of the set of near-touch coordinates with the location of the particular one of the keys on the mechanical keypad that is pressed by the primary touch to determine the approach orientation.

6. The method of claim 1, where the detecting the primary touch and the detecting on the touch panel the set of near-touch coordinates are performed using the same touch panel technology.

7. The method of claim 6, where the touch panel comprises capacitive touch panel technology.

8. The method of claim 1, wherein the known keyboard format includes a QWERTY format.

9. A device comprising:
    a display to display information;
    an input key including a character from a right keyboard half and a character from a left keyboard half of a first keyboard format;
    a touch panel to identify a set of near-touch coordinates related to a primary touch on the input key, wherein the primary touch is detected based on a first level of sensitivity of the touch panel and the near-touch coordinates are detected based on a second, different level of sensitivity of the touch panel; and
    a processor to:
        interpret an approach orientation of the primary touch as one of a left-hand touch or a right-hand touch based on the location of the primary touch and the set of near touch coordinates;
        generate one of a first command signal corresponding to the character from the right keyboard half or a second command signal corresponding to the character from the left keyboard half based on the primary touch on the input key and the interpretation of the approach orientation; and
        alter the display based on the first command signal or the second command signal.

10. The device of claim 9, where the input key is a key on a virtual keyboard.

11. The device of claim 10, where, when interpreting the approach orientation of the primary touch, the processor is to:
    determine a weighted center of the set of near-touch coordinates;
    determine a weighted center of a set of primary touch coordinates; and
    compare the weighted center of the set of near-touch coordinates with the weighted center of the set of primary touch coordinates to determine the approach orientation.

12. The device of claim 9, where the input key is a key on a mechanical keypad.

13. The device of claim 12, where, when interpreting the approach orientation of the primary touch, the processor is to:
    determine a weighted center of the set of near-touch coordinates; and
    compare the weighted center of the set of near-touch coordinates with the location of the primary touch to determine the approach orientation.

14. The device of claim 9, wherein the input key is included in a keypad that overlaps the right keyboard half and the left keyboard half.

15. The device of claim 9, where the input key is configured to indicate whether the interpreted approach orientation of the primary touch is the left-side touch or the right-side touch.

16. The device of claim 9, where the input key is a key of a virtual keyboard displayed beneath the touch panel and where the location of the primary touch is identified using the touch panel.

17. A device comprising:
- means for presenting, on a key of the device, a character from a right keyboard half of a first keyboard format and a character from a left keyboard half of the first keyboard format, wherein the key represents variable inputs;
- means for detecting, with a first level of sensitivity, a primary touch on a key the device;
- means for detecting, with a second level of sensitivity that is different than the first level, location of a near-touch associated with the primary touch;
- means for identifying an approach orientation of the primary touch as one of a left-hand touch or a right-hand touch based on the primary touch and the location of the near-touch;
- means for generating one of a first command signal corresponding to the character from the right keyboard half or a second command signal corresponding to the character from the left keyboard half based on the primary touch and the approach orientation; and
- means for performing an action based on the first command signal or the second command signal.

18. The device of claim 17, wherein the key is a key of a virtual keypad.

* * * * *